Patented Apr. 1, 1941                                      2,236,507

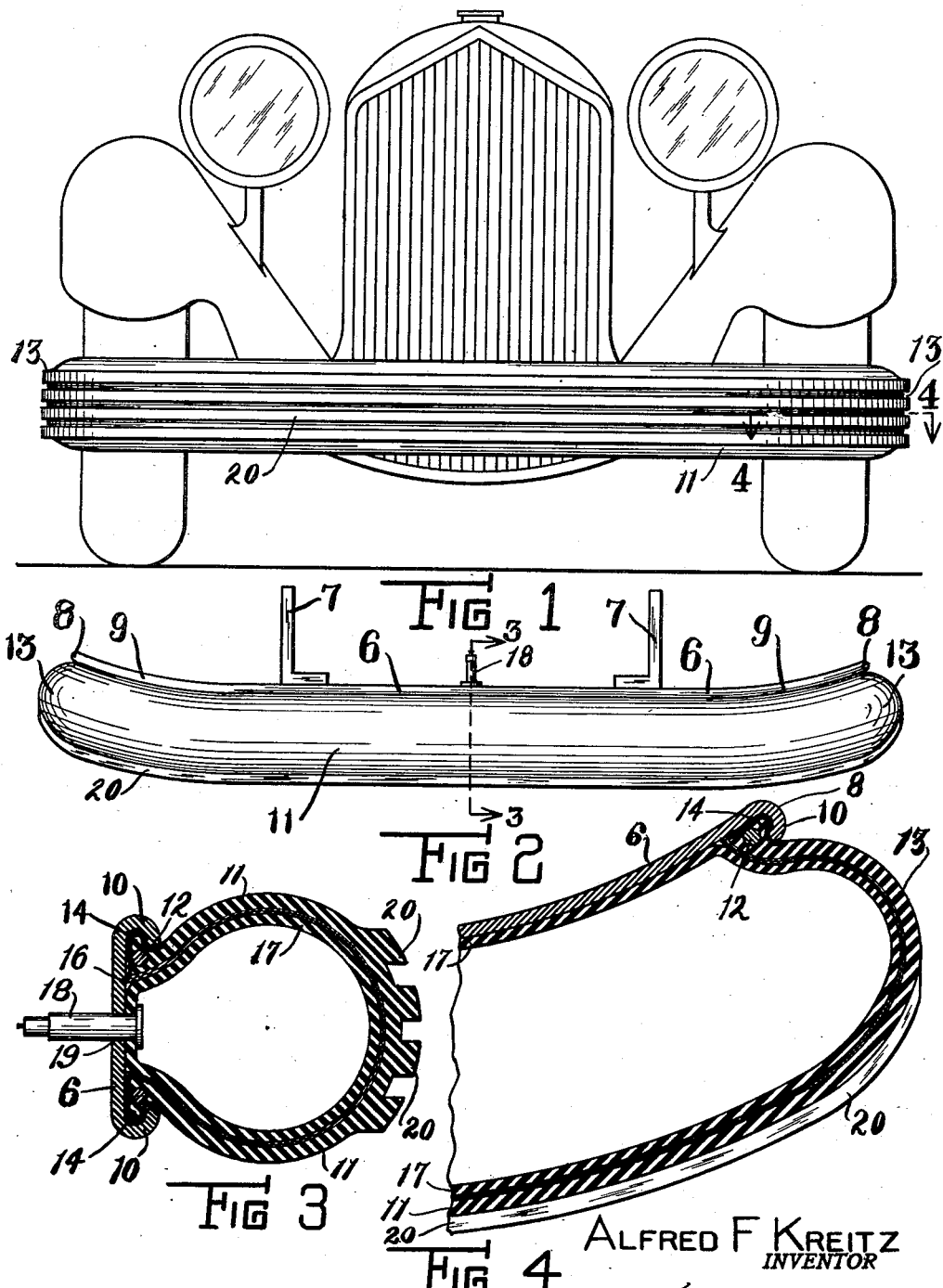

UNITED STATES PATENT OFFICE 2,236,507

PNEUMATIC BUMPER

Alfred F. Kreitz, Akron, Ohio

Application April 16, 1938, Serial No. 202,503

6 Claims. (Cl. 293—55)

This invention relates to improvements in bumpers for vehicles, particularly motor driven vehicles.

Objects of the invention are to provide a pneumatic bumper of simple, durable construction, which can be economically manufactured and which will be very efficient in use.

Particular objects of the invention are to provide a pneumatic bumper which will include an elongated mounting plate having its marginal portion turned forwardly and inwardly to form a clincher flange; to provide a flexible casing, preferably composed of rubber, rubber composition with or without textile fabric or cord reinforcement and having a base provided with a bead adapted to interlock with said flange to positively hold the casing on the plate without additional fastening means; to provide an inflatable inner tube adapted to fit in the cavity of said casing and to provide means for rigidly securing the base to a vehicle.

Additional objects are to provide a bumper having a body in the form of a casing composed of rubber, preferably reinforced with cords or textile fabric and provided on the shock receiving face thereof with a relatively thick wall in the form of a tread extending longitudinally thereof and extending around the ends thereof and to thereby provide a pneumatic bumper having a relatively thick wall over the shock receiving areas thereof.

Still further objects are to provide a bumper including a rubber casing of the character above indicated having unitary longitudinally disposed ribs and grooves in the shock receiving side thereof and to provide a demountable pneumatic casing which may be molded to match the configuration of the tires on the vehicle and which will be ornamental in appearance and can be quickly and conveniently mounted or demounted for replacement or repair.

The above objects are accomplished and additional ends are attained by the novel construction, combination and arrangement of parts hereinafter described and illustrated in the accompanying drawing wherein there is shown a preferred form of the invention, it being understood that the invention is capable of various adaptations and that changes and modifications may be made which come within the scope of the claims hereunto appended.

In the drawing like characters of reference are employed to designate like parts as the same may appear in any of the several views and in which:

Figure 1 is a front, elevational view showing the forward portion of an automobile with a bumper constructed in accordance with this invention operatively positioned thereon.

Figure 2 is a top plan view of a bumper constructed in accordance with this invention, Figure 3 is a cross sectional view taken as indicated by the lines 3—3 of Figure 2, Figure 4 is a longitudinal, sectional view of one end portion of a bumper constructed in accordance with this invention, the same being taken as indicated by the lines 4—4 of Figure 1.

Proceeding now to a detailed description of the invention with reference to the particular adaptation thereof illustrated in the drawing, the numeral 6 is employed to designate a bumper base which is preferably composed of sheet metal. The bumper base 6 is provided with suitable brackets 7 which are welded or otherwise secured to the rear face of the base 6 and which are adapted to rigidly secure the base 6 to a vehicle.

The bumper 6 is preferably provided with round ends 8 and rearwardly turned end portions 9. The marginal edge portion of the base 6 is turned forwardly and inwardly to provide a hooked flange 10 for receiving and retaining the base edge of a bumper casing as hereinafter described. The casing 11 is preferably composed of rubber reinforced with one or more layers of cord or fabric or other suitable material. The casing terminates at each end thereof in a rounded outwardly bulged wall 13 which is similar in contour to the side walls of the casing.

The sides and ends of the casing 11 are in the form of an endless wall which extends entirely around the casing and is uniform in cross sectional contour throughout. The casing 11 is provided on one side thereof with a flat base portion which fits against the flanged side of the bumper base 6. The flat side of the casing 11 is provided with an opening which is disposed longitudinally thereof and the wall forming the sides and ends of the casing terminates in a base portion which extends entirely around said opening. The base portion is provided with an endless wire 12 or other reinforcing element which is embedded therein and extends longitudinally thereof as shown in Figures 3 and 4.

The numeral 14 denotes a bead which projects outwardly from the outer face of the base edge portion of the casing and extends entirely therearound. The bead 14 is adapted to fit in the hooked flange 10 to retain the casing on the base 6. The interior surface of the casing meets the inner circumferential edge thereof at an acute angle thereby providing an inner projecting knifelike edge portion 16 which will lie flat against the base 6.

The numeral 17 denotes an inner tube which is preferably composed of elastic rubber and is shaped to fit the cavity of the casing 11. The inner tube 17 is provided with a suitable inflation stem 18 which projects through the opening 19 in the bumper base 6.

The casing 11 is thickened along the forward and lateral walls thereof to provide a tread 20. The tread 20 may be provided with longitudinal grooves 21 or may be molded or otherwise formed in any desired configuration. From the above description, and from the sectional views shown in the drawing, it will be noted that the casing 11 is very similar in construction to that employed in the manufacture of pneumatic tire casings and that the inner tube 14 is similar to and serves practically the same purpose as the inner tube in a pneumatic tire. It has been found a great advantage to manufacture the casing 11 in a mold matching the configuration of a tire on a vehicle on which the bumper is to be used, thus providing a very effective bumper which adds materially to the appearance of a vehicle on which it is used.

It will be noted that the base 6 is not in the nature of a spring and that the brackets 7 are not springs but are adapted to attach the base 6 rigidly to a vehicle. In the drawing there is shown a full sized bumper which may extend entirely across either the front or rear ends of a vehicle, but it is understood that the bumper may be formed in short sections, known as "bumperettes."

In use, the brackets 7 are suitably secured to the vehicle chassis. The inner tube 17 positioned in the casing 11 and the base edges of the casing are hooked into the flange 10. The inner tube 14 is then inflated through the stem 18 to any desired pressure. The pressure within the tube 17 bears against the base edges of the casing 11 and securely holds the bead 14 within the hooked flange 10. It will be seen that the tread 20 is positioned to receive the shock when the bumper is brought into forced contact with any object and that the side walls are thinner and will readily flex without injury to the casing 11.

Having thus illustrated my invention and described the same in detail, what I claim as new and desire to secure by Letters Patent is:

1. In a bumper, an elongated casing having an opening along one side thereof, said casing having an endless base of uniform cross sectional shape which extends entirely around said opening, a rounded rib projecting laterally from the outer side of said base and extending entirely therearound, an endless wire reinforcing element embedded in said base and extending longitudinally thereof; a mounting plate having rounded ends, the entire perimetric portion of said plate curved forwardly and inwardly to overhang said plate and form a continuous clincher flange, said casing mounted on said plate with said flange engaging said rib to hold the casing in an operative position on said plate without additional fastening means.

2. In a bumper of the character described, an elongated casing having an opening extending longitudinally along one side thereof, said casing having an endless base extending entirely around said opening, an endless reinforcing element embedded in said base, a clincher rib projecting laterally from the outer side of said base and extending longitudinally thereof, an elongated mounting plate having outwardly arched ends, a perimetric flange projecting forwardly and inwardly from said plate to form an endless seat adapted to receive and hold said rib, said casing mounted on said plate with said flange engaging said rib to positively hold the casing on said base.

3. In a device of character described, a flat bumper base having rearwardly turned end portions each terminating in a rounded end, the perimetric portions of said base curved forwardly and inwardly to form an endless clincher fiange overhanging said base and providing a groove of uniform rounded cross-section which extends entirely around the inner face thereof, a pneumatic casing having an endless base conforming in outline to the outline of said bumper base, said casing provided at the base with a co-extensive, laterally projecting bead, said bead adapted to be snugly received in said groove; the wall of said casing converging outwardly from said base into a relatively large tubular body with side and end walls of substantially the same cross sectional contour, a reinforcing element embedded in the base of said casing and extending longitudinally thereof; a pneumatic tube in said casing, said tube when inflated adapted to maintain said bead in said flange and hold the casing on said base without additional fastening means.

4. In a bumper, a mounting member comprising an elongated plate having rounded end portions, the marginal portions of said plate turned forwardly and inwardly to provide an endless clincher flange which extends continuously around the entire perimeter of said plate; an elongated, fabric, reinforced, flexible rubber casing having an opening along one side thereof and having side and end walls terminating in a base portion extending entirely around said opening; an endless reinforcing wire embedded in said base portion, said base portion provided on the outwardly presented side thereof with an endless clincher bead which interlocks with the clincher flange on said mounting member to hold the casing thereon; said side and end walls bulging outwardly from said bead and having substantially the same cross sectional contour; an inflatable, flexible tube completely filling said casing and a stem for inflating said tube.

5. In a bumper, a mounting member composed of an elongated plate having rounded end portions, said plate provided on one side thereof with a clincher flange which projects from one side thereof and extends continuously around the entire perimeter thereof; an elongated, flexible casing composed of rubber, a reinforcing layer of fabric covering the entire inner surface thereof, said casing having an opening along one side thereof and having side and end walls terminating in a base portion extending entirely around said opening; an endless reinforcing element embedded in said base portion, an endless clincher bead on the outwardly presented side of said base portion, said bead interlocking with the clincher flange on said mounting member to hold the casing thereon; said side and end walls having substantially the same cross-sectional contour; an elastic, inner tube in said casing, said tube having an inflation stem which projects through an aperture in said mounting member and means for rigidly securing said bumper in an operative position on a vehicle.

6. In a bumper of the character described, an elongated base plate, means to rigidly secure said plate in a horizontal position on a vehicle, with the plate positioned in an upright plane; the ends of said plate being rounded to merge into the upper and lower sides thereof in a continuous line; the entire perimetric edge of said plate curved forwardly and inwardly to form an endless, clincher flange; an elongated pneumatic casing having an opening disposed longitudinally along one side thereof; said casing having an endless base extending entirely around said opening, said base shaped to fit against the forwardly presented side of said base plate; an endless wire reinforcement embedded in said base and extending longitudinally thereof; an endless bead extending entirely around said base and engaged by said flange; the base and side wall of said casing being uniform in construction and contour on every cross-section, and an inflatable tube in said casing.

ALFRED F. KREITZ.